United States Patent
Wright et al.

(10) Patent No.: US 8,525,856 B2
(45) Date of Patent: Sep. 3, 2013

(54) METHODS AND SYSTEMS FOR MARKING AN AIRFRAME SKIN

(75) Inventors: Daniel J. Wright, Mercer Island, WA (US); James C. Van Avery, Renton, WA (US)

(73) Assignee: The Boeing Company, Chicago, IL (US)

( * ) Notice: Subject to any disclaimer, the term of this patent is extended or adjusted under 35 U.S.C. 154(b) by 157 days.

(21) Appl. No.: 13/078,723

(22) Filed: Apr. 1, 2011

(65) Prior Publication Data
US 2012/0249710 A1   Oct. 4, 2012

(51) Int. Cl.
*B41J 2/00* (2006.01)

(52) U.S. Cl.
USPC .......................................... 347/110

(58) Field of Classification Search
USPC .......................................... 347/110
See application file for complete search history.

(56) References Cited

U.S. PATENT DOCUMENTS

| | | | |
|---|---|---|---|
| 3,213,461 A * | 10/1965 | Goddard | 360/230 |
| 3,272,568 A | 9/1966 | Koorneef et al. | |
| 3,281,862 A | 10/1966 | Kirchner | |
| 3,939,482 A | 2/1976 | Cotter | |
| 4,423,428 A * | 12/1983 | Kuwabara et al. | 346/139 C |
| 4,642,897 A | 2/1987 | Kirsch | |
| 4,661,681 A | 4/1987 | Bannister | |
| 6,778,206 B2 * | 8/2004 | Kinjyou et al. | 347/263 |
| 6,847,181 B2 * | 1/2005 | Brooks et al. | 318/568.11 |
| 7,131,372 B2 | 11/2006 | Lyons | |
| 2006/0068109 A1 * | 3/2006 | Frankenberger et al. | 427/256 |
| 2010/0233373 A1 | 9/2010 | Swanberg et al. | |

FOREIGN PATENT DOCUMENTS

| FR | 2722437 A1 | 1/1996 |
|---|---|---|
| JP | 61169117 A | 7/1986 |

OTHER PUBLICATIONS

International Search Report and Written Opinion for PCT/US2012/022507 dated Jun. 1, 2012, 9 pages.

* cited by examiner

*Primary Examiner* — Laura Martin
*Assistant Examiner* — Jeremy Bishop
(74) *Attorney, Agent, or Firm* — Armstrong Teasdale LLP

(57) ABSTRACT

Method and system for marking a surface. A writing medium is positioned within a cavity defined in a body extending between a first end and a second end of a wand. The first end is coupleable to a robot. The second end is opposite the first end and has an opening defined therein in fluid communication with the cavity. The second end is positioned adjacent to the surface. A position of at least one of the writing medium and the second end is automatically maintained relative to the surface.

16 Claims, 4 Drawing Sheets

METHODS AND SYSTEMS FOR MARKING AN AIRFRAME SKIN

BACKGROUND

The present disclosure relates generally to marking systems and, more particularly, to methods and systems for use in marking an airframe skin.

Known airframe skins are often marked to facilitate assembling an aircraft and/or enable a decal to be positioned on the airframe skin. Marking an airframe skin by hand, however, is generally inconsistent and/or time-consuming. To facilitate speeding up the marking process, known marking systems may be used that automatically mark the airframe skin. The airframe skin, however, is relatively delicate and at least some known marking systems are not suitably sensitive.

BRIEF DESCRIPTION

In one aspect, a method is provided for marking a surface. The method includes positioning a writing medium within a body extending between a first end and a second end of a wand. The first end is coupleable to a robot. The second has an opening that is in fluid communication with the cavity. The second end is positioned adjacent to the surface. A position of at least one of the writing medium and the second end is automatically maintained relative to the surface.

In another aspect, a wand is provided for use in marking a surface. The wand includes a first end, a second end opposite the first end and including an opening defined therein, and a body extending between the first end and the second end. The body includes a cavity defined therein sized to receive a writing medium therein. The cavity is in fluid communication with the opening. An adjusting mechanism is configured to facilitate maintaining a position of at least one of the writing medium and the second end relative to the surface.

A system is provided for use in marking a surface. The system includes a robot, a writing medium, and a wand. The wand includes a first end coupled to the robot, a second end opposite the first end and including an opening, and a body extending between the first end and the second end. The body includes a cavity defined therein sized to receive the writing medium therein. The cavity is in fluid communication with the opening. An adjusting mechanism is configured to facilitate maintaining a position of at least one of the writing medium and the second end relative to the surface.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, such illustrations are for convenience only. Any feature of a drawing may be referenced and/or claimed in combination with any feature of any other drawing.

DETAILED DESCRIPTION

The subject matter described herein relates generally to a marking system and, more particularly, to methods and systems for use in accurately and/or precisely marking, for example, an airframe skin. In one embodiment, a wand includes a discharging mechanism that selectively discharges a writing medium from the wand towards a target surface. An adjusting mechanism is selectively operable to facilitate maintaining a position of at least one of the writing medium and the wand relative to the surface. As such, the adjusting mechanism enables the target surface to be marked with a desired amount of pressure applied to the target surface.

An element or step recited in the singular and proceeded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

Figure 1:
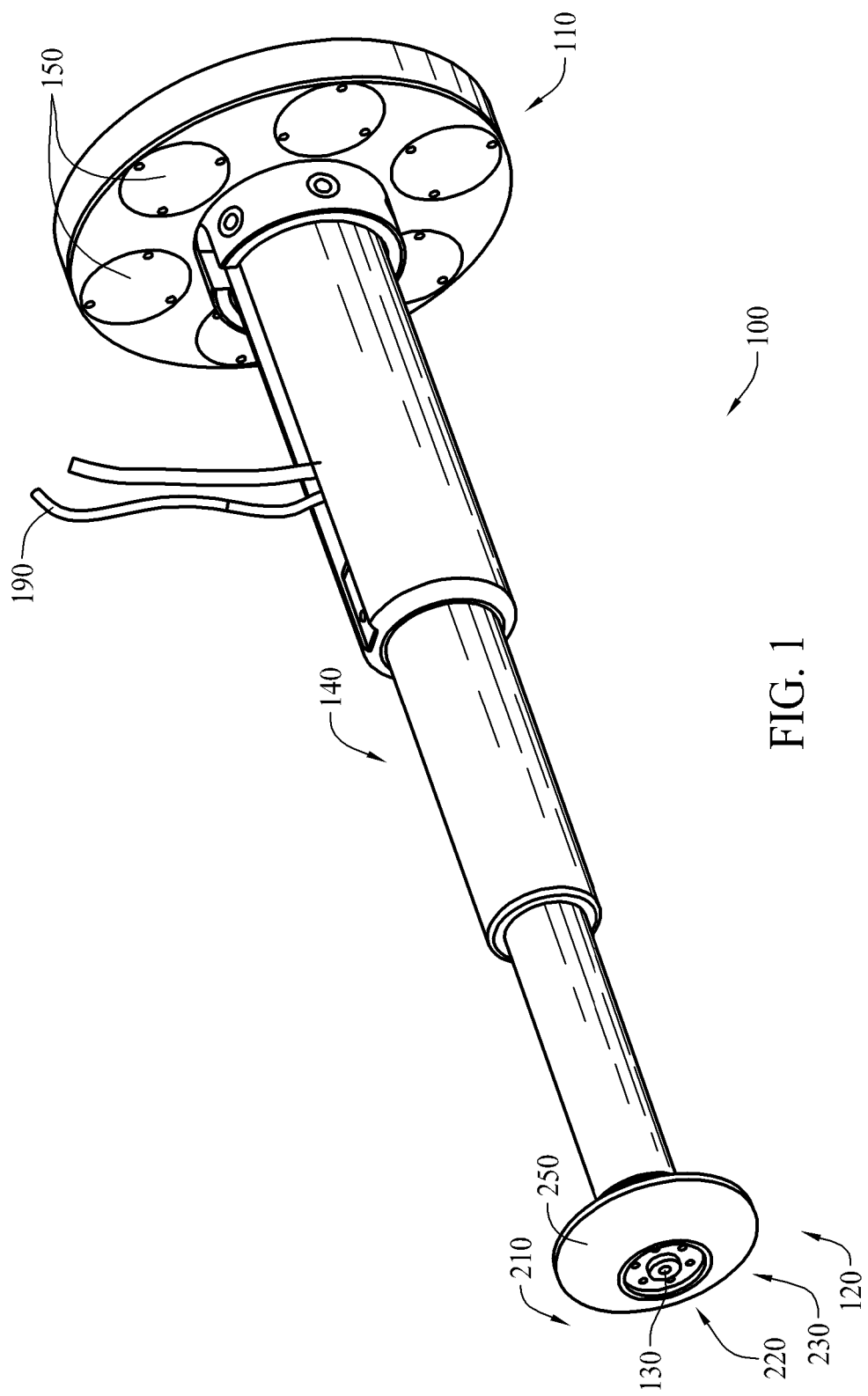
FIG. 1 is a perspective view of an exemplary marking system that may be used to mark, for example, aircraft skin.
Figure 2:
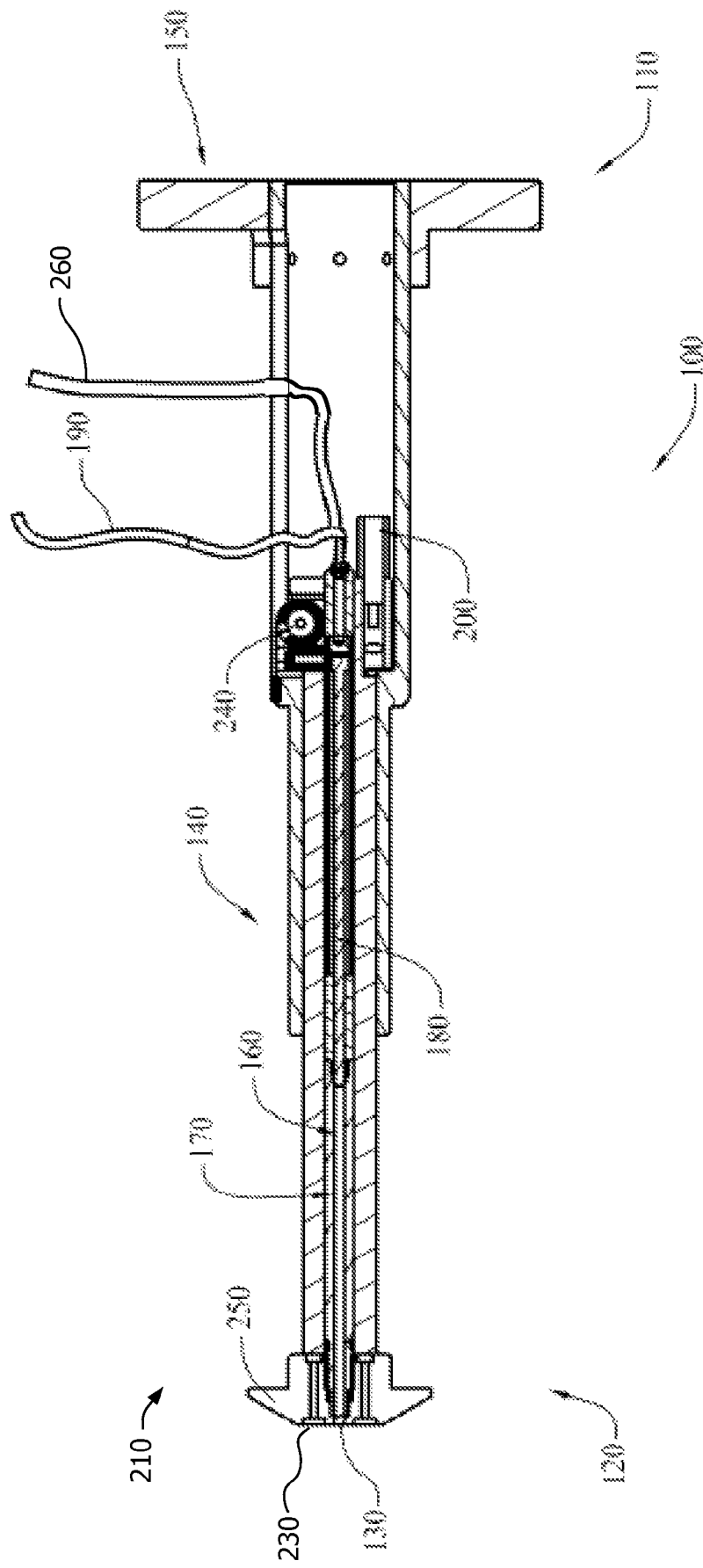
FIG. 2 is a cross-sectional view of the marking system shown in FIG. 1.

FIG. 1 is a perspective view of an exemplary marking system or wand 100. FIG. 2 is a cross-sectional view of wand 100. In the exemplary embodiment, wand 100 includes a first end 110 that is coupleable to a robot (not shown), a second end 120 that includes an opening 130 formed therein, and a body 140 that extends therebetween. In the exemplary embodiment, the robot may be programmed to automatically control movement of wand 100.

In the exemplary embodiment, first end 110 includes a safety mechanism 150 that enables first end 110 to automatically break-away from the robot should an undesired force be applied to the robot and/or to wand 100. That is, in the exemplary embodiment, safety mechanism 150 enables wand 100 to be quickly uncoupled from the robot. For example, in the exemplary embodiment, safety mechanism 150 includes a plurality of neodymium magnets spaced radially about body 140 at first end 110. Alternatively, safety mechanism 150 may be any suitable safety mechanism that enables wand 100 to function as described herein.

Figure 4:
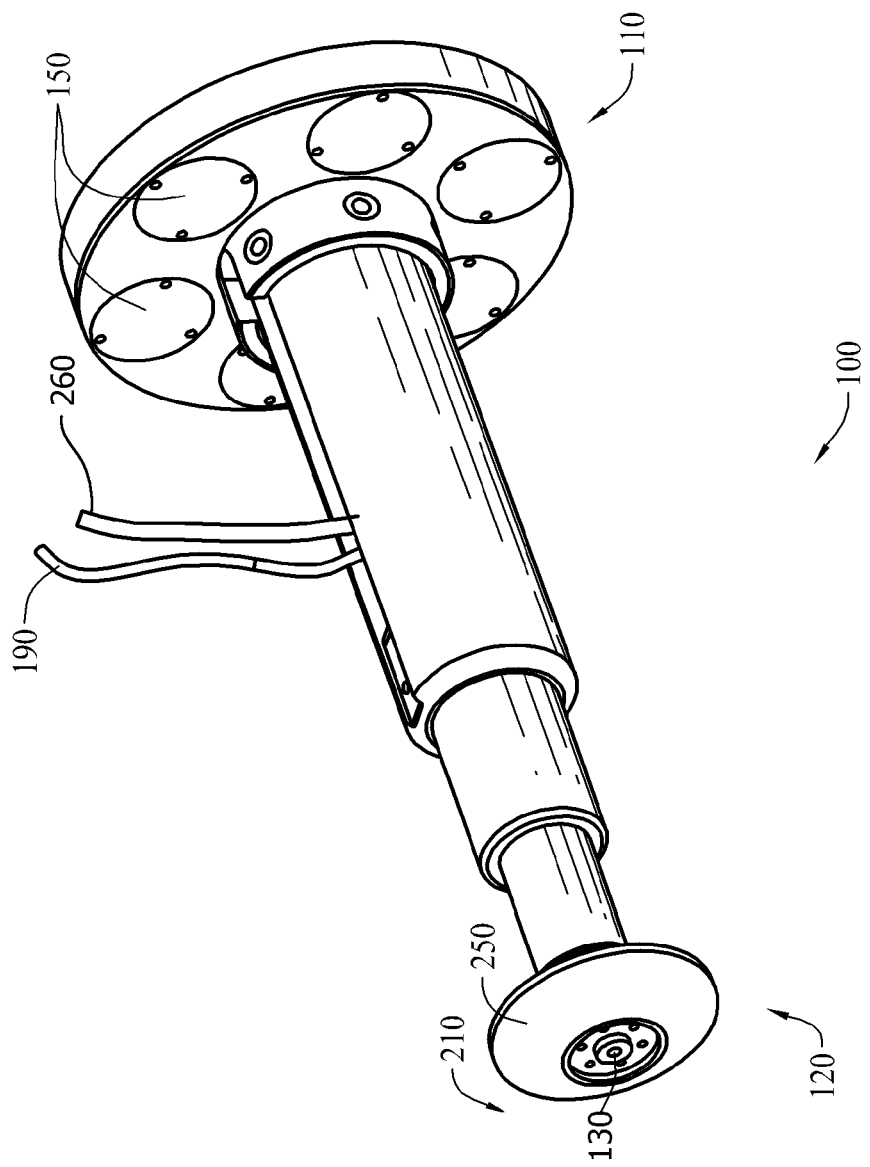
FIG. 4 is a perspective view of the marking system shown in FIG. 1 in a contracted configuration.

In the exemplary embodiment, body 140 is selectively actuatable between an expanded configuration, as shown in FIGS. 1 and 2, and a contracted configuration (shown in FIG. 4). For example, in the exemplary embodiment, body 140 is a telescoping body. Alternatively, body 140 may have any suitable configuration that enables wand 100 to function as described herein.

In the exemplary embodiment, body 140 has a cavity 160 defined therein. Cavity 160 is sized to receive a writing medium 170 therein. More specifically, in the exemplary embodiment, a cartridge, shown in FIG. 3, houses writing medium 170. Moreover, in the exemplary embodiment, writing medium 170 includes a water-soluble material that is substantially free of contaminants. For example, writing medium 170 may include graphite. Alternatively, writing medium 170 may include any suitable writing medium that enables wand 100 to function as described herein.

In the exemplary embodiment, cavity 160 is in fluid communication with opening 130 such that a first discharging mechanism 180 may selectively discharge writing medium 170 from cavity 160 through opening 130. In the exemplary embodiment, first discharging mechanism 180 selectively discharges writing medium 170 from opening 130 towards a target surface (not shown). For example, in the exemplary embodiment, first discharging mechanism 180 is a pneumatic system that includes an air line 190 coupled to a pneumatically-operated switch 200 that selectively discharges air to discharge writing medium 170 from opening 130. Alternatively, first discharging mechanism 180 may be any suitable discharging mechanism that enables wand 100 to function as described herein.

In the exemplary embodiment, wand 100 includes an adjusting mechanism 210 that enables a position of writing medium 170 and/or second end 120 to be maintained relative to the target surface. In one embodiment, adjusting mechanism 210 includes a sensor (not shown) that detects a distance (not shown) between second end 120 and the target surface. In one embodiment, adjusting mechanism 210 selectively maintains the position of writing medium 170 and/or second end 120 relative to the target surface based on the detected distance.

In one embodiment, a computing system including a memory device (not shown) and a processor (not shown) coupled to the memory device may be used to enable the position of writing medium 170 and/or second end 120 to be selectively maintained. In such an embodiment, the computing system is configurable to perform one or more operations described herein by programming the memory device and/or processor. As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits. Moreover, the term "memory device" refers to a device that enables information such as executable instructions and/or other data to be selectively stored and retrieved.

In the exemplary embodiment, adjusting mechanism 210 includes a second discharging mechanism 220 that is also coupled to air line 190. More specifically, in the exemplary embodiment, second discharging mechanism 220 selectively discharges an airstream (not shown) from second end 120 towards the target surface. In the exemplary embodiment, the airstream discharged from second end 120 provides a buffer or a cushion of air between second end 120 and the target surface that facilitates second end 120 gliding smoothly across the target surface.

Moreover, in the exemplary embodiment, adjusting mechanism 210 includes a first biasing mechanism 230 and/or a second biasing mechanism 240. In the exemplary embodiment, first biasing mechanism 230 is positioned to bias second end 120 towards the target surface. That is, in the exemplary embodiment, second end 120 is magnetically attracted to and/or forced towards the target surface. In the exemplary embodiment, first biasing mechanism 230 provides a force that is opposite the force induced by second discharging mechanism 220. For example, in the exemplary embodiment, first biasing mechanism 230 includes a plurality of magnets spaced radially about opening 130 at second end 120. Alternatively, first biasing mechanism 230 may be any suitable biasing mechanism that enables wand 100 to function as described herein.

Additionally, in the exemplary embodiment, second biasing mechanism 240 dampens a force applied to writing medium 170. That is, in the exemplary embodiment, when writing medium 170 is applied to the target surface, an opposing force pushes writing medium 170 towards first end 110. In such an application, second biasing mechanism 240 mechanically pushes and/or forces writing medium 170 towards second end 120 with a force that is in proportion to the opposing force. As such, in the exemplary embodiment, second biasing mechanism 240 facilitates decreasing the pressure applied against the target surface interface such that writing medium 170 is maintained in relatively light contact with the target surface. For example, in the exemplary embodiment, second biasing mechanism 240 is a clock spring. Alternatively, second biasing mechanism 240 may be any suitable biasing mechanism that enables wand 100 to function as described herein.

In the exemplary embodiment, an end cap 250 is threadably coupled to second end 120 to enable writing medium 170 to be loaded into and/or unloaded from cavity 160. More specifically, in the exemplary embodiment, end cap 250 is selectively removable from second end 120 to enable writing medium 170 to be loaded into and/or unloaded from cavity 160, and is coupled to second end 120 to facilitate retaining at least a portion of writing medium 170 within cavity 160.

In the exemplary embodiment, end cap 250 is substantially frustoconical in shape to facilitate reducing damage to the target surface in the event that second end 120 contacts the target surface. Additionally, or alternatively, end cap 250 is rotatable and/or pivotable along a plurality of axes to facilitate reducing damage to the target surface in the event that second end 120 contacts the target surface. As such, end cap 250 has a wide degree of freedom to facilitate maintaining a position of end cap 250 relative to the target surface. Moreover, in the exemplary embodiment, end cap 250 is fabricated at least from a material having a low coefficient of friction that enables second end 120 to slide or "glide" about the target surface. For example, in one embodiment, end cap 250 is fabricated from polytetrafluoroethylene. Alternatively, end cap 250 may have any suitable shape and/or may be fabricated from any suitable medium that enables wand 100 to function as described herein.

In one embodiment, a humidifying mechanism 260 is used to selectively humidify at least a portion of writing medium 170. That is, in the exemplary embodiment, writing medium 170 is humidified to facilitate preventing writing medium 170 from drying out such that writing medium 170 is continuously able to mark on the target surface.

Figure 3:
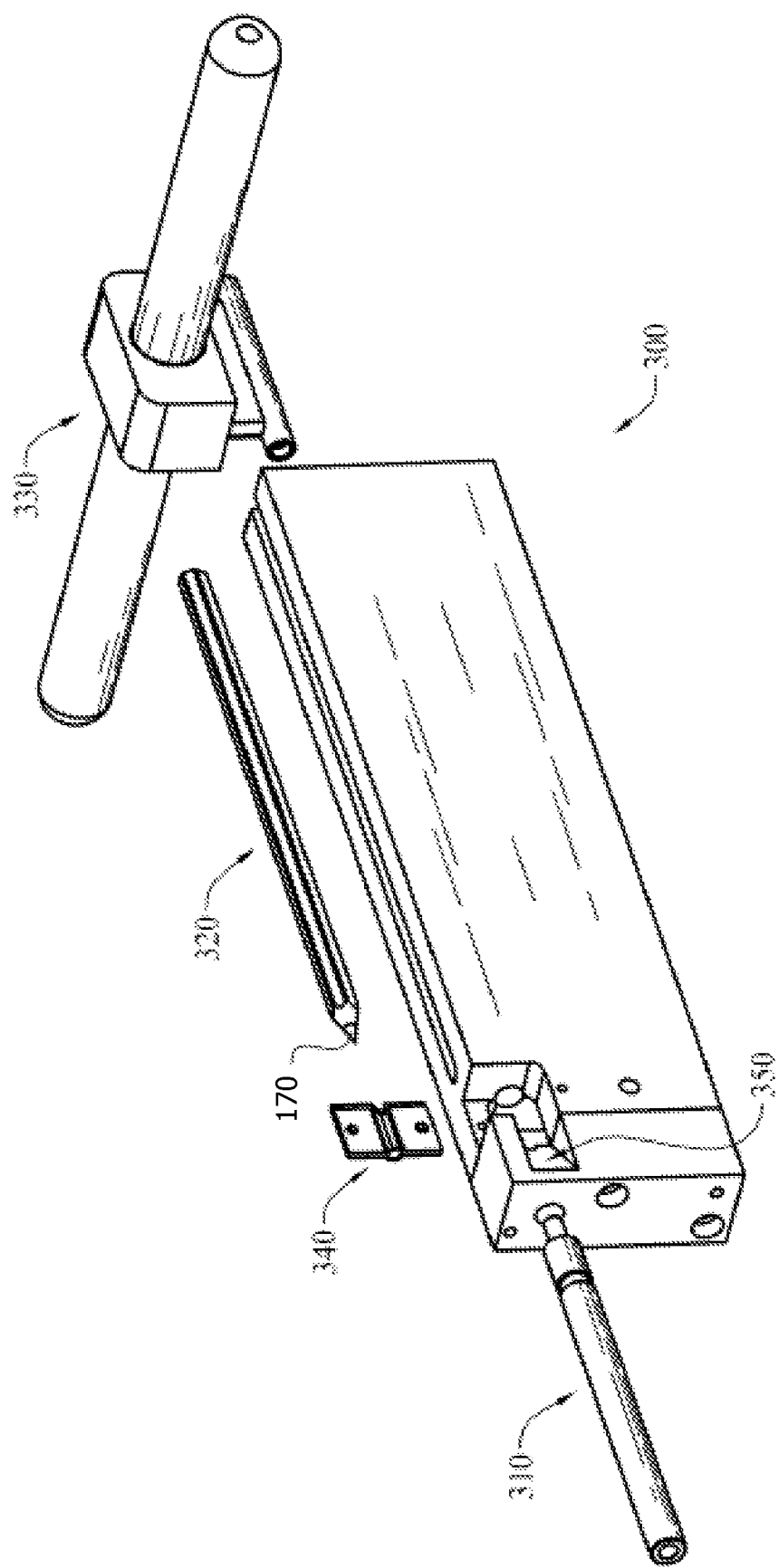
FIG. 3 is a perspective view of an exemplary writing medium extracting system that may be used with the marking system shown in FIG. 1.

FIG. 3 is a perspective view of an exemplary writing medium extracting system 300 that may be used to extract writing medium 170 and/or to position writing medium 170 within a cartridge 310 that is suitable for use with wand 100. In the exemplary embodiment, a pencil 320 including writing medium 170 disposed therein is loaded into extracting system 300, and a handle 330 is used to force pencil 320 towards cartridge 310. More specifically, in the exemplary embodiment, handle 330 forces pencil 320 towards a cutting blade 340 that selectively extracts writing medium 170 from pencil 320 and into cartridge 310. As such, in the exemplary embodiment, cutting blade 340 enables cartridge 310 to be loaded without breaking writing medium 170 and/or selectively gauges writing medium 170 to a desired diameter. In the exemplary embodiment, waste material removed from pencil 320 is ejected towards a waste ejection area 350.

During operation, in the exemplary embodiment, extracting system 300 extracts writing medium 170 from pencil 320 and positions writing medium 170 within cartridge 310. In the exemplary embodiment, end cap 250 is uncoupled from second end 120, and writing medium 170 and/or cartridge 310 is loaded into cavity 160 as needed. End cap 250 is coupled to second end 120 to secure writing medium 170 in position within cavity 160.

In the exemplary embodiment, second end 120 is positioned adjacent to the target surface, and writing medium 170 is selectively discharged from opening 130 and is positioned to selectively mark the target surface. In the exemplary embodiment, adjusting mechanism 210 automatically maintains a position of writing medium 170 and/or second end 120 relative to the target surface. More specifically, in the exemplary embodiment, first biasing mechanism 230 biases second end 120 towards the target surface, and second discharging mechanism 220 provides a cushion between second end 120 and the target surface. Moreover, in the exemplary embodiment, second biasing mechanism 240 facilitates controlling the force applied by writing medium 170 to the target surface.

The above-described embodiments enable a writing medium to be loaded within a cartridge, and the writing medium to be applied to a surface. The embodiments described herein facilitate automatically controlling a pressure applied to the surface. That is, the embodiments described herein include a plurality of mechanisms that enable the writing medium to delicately contact the surface. Accordingly, the measurement system described herein facilitates accurately and/or efficiently marking a surface.

Exemplary embodiments of systems and methods for marking an airframe skin are described above in detail. The systems and methods are not limited to the specific embodiments described herein, but rather, components of systems and/or steps of the method may be utilized independently and separately from other components and/or steps described herein. Each component and each method step may also be used in combination with other components and/or method steps. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for marking a surface, said method comprising:
    positioning a writing medium within a body extending between a first end and a second end of a wand, wherein the first end is coupleable to a robot, and the second end has an opening that is in fluid communication with a cavity;
    positioning the second end adjacent to the surface to be marked; and
    automatically maintaining a position of at least one of the writing medium and the second end relative to the surface, wherein automatically maintaining a position comprises:
        discharging air from the second end towards the surface to be marked to facilitate providing a cushion between the second end and the surface; and
        biasing the second end towards the surface to be marked.

2. A method in accordance with claim 1, wherein automatically maintaining a position further comprises biasing the writing medium towards the second end.

3. A method in accordance with claim 1, further comprising selectively actuating the body between an expanded configuration and a contracted configuration.

4. A method in accordance with claim 1 further comprising selectively humidifying at least a portion of the writing medium.

5. A wand for use in marking a surface, said wand comprising:
    a first end;
    a second end opposite said first end and comprising an opening defined therein;
    a body extending between said first end and said second end, said body comprising a cavity defined therein sized to receive a writing medium therein, the cavity in fluid communication with the opening; and
    an adjusting mechanism configured to facilitate maintaining a position of at least one of the writing medium and said second end relative to the surface, said adjusting mechanism comprising:
        a discharging mechanism configured to discharge an airstream from said second end towards the surface; and
        a biasing mechanism configured to bias said second end towards the surface.

6. A wand in accordance with claim 5, wherein said adjusting mechanism further comprises a biasing mechanism that is positioned to bias the writing medium towards said second end.

7. A wand in accordance with claim 5, wherein said body is configured to selectively actuate between an expanded configuration and a contracted configuration.

8. A wand in accordance with claim 5, wherein said first end comprises a safety mechanism that enables said first end to breakaway from said robot when coupled to the robot.

9. A wand in accordance with claim 5 further comprising a humidifying mechanism configured to selectively humidify at least a portion of the writing medium.

10. A wand in accordance with claim 5 further comprising an end cap that is substantially frustoconical in shape.

11. A system for use in marking a surface, said system comprising:
    a robot;
    a writing medium;
    a wand comprising a first end coupled to said robot, a second end opposite said first end and comprising an opening defined therein, and a body extending between said first end and said second end, said body comprising a cavity defined therein sized to receive said writing medium therein, the cavity in fluid communication with the opening; and
    an adjusting mechanism configured to facilitate maintaining a position of at least one of said writing medium and said second end relative to the surface, said adjusting mechanism comprising:
        a discharging mechanism configured to discharge an airstream from said second end towards the surface; and
        a first biasing mechanism configured to bias said second end towards the surface.

12. A system in accordance with claim 11, wherein said adjusting mechanism further comprises:
    a second biasing mechanism that is positioned to bias said writing medium towards said second end.

13. A system in accordance with claim 11, wherein said body is configured to selectively actuate between an expanded configuration and a contracted configuration.

14. A system in accordance with claim 11, wherein said first end comprises a safety mechanism that enables said first end to breakaway from said robot when coupled to the robot.

15. A system in accordance with claim 11 further comprising a humidifying mechanism configured to selectively humidify at least a portion of said writing medium.

16. A system in accordance with claim 11 further comprising an end cap that is substantially frustoconical in shape.

* * * * *